US012687682B2

(12) United States Patent
Kalman et al.

(10) Patent No.: US 12,687,682 B2
(45) Date of Patent: **\*Jul. 21, 2026**

(54) MULTI-ARRAY PARALLEL OPTICAL LINKS

(71) Applicant: AvicenaTech Corp., Mountain View, CA (US)

(72) Inventors: Robert Kalman, Mountain View, CA (US); Bardia Pezeshki, Mountain View, CA (US); Alexander Tselikov, Mountain View, CA (US)

(73) Assignee: AvicenaTech, Corp., Sunnyvale, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/489,558

(22) Filed: Oct. 18, 2023

(65) Prior Publication Data

US 2024/0045155 A1 Feb. 8, 2024

Related U.S. Application Data

(63) Continuation of application No. 17/662,002, filed on May 4, 2022, now Pat. No. 11,822,135.

(60) Provisional application No. 63/186,706, filed on May 10, 2021.

(51) Int. Cl.
*G02B 6/42* (2006.01)
*G02B 6/36* (2006.01)

(52) U.S. Cl.
CPC ......... *G02B 6/4203* (2013.01); *G02B 6/4249* (2013.01); *G02B 6/3664* (2013.01)

(58) Field of Classification Search
CPC .. G02B 6/04–08; G02B 6/4249; G02B 6/425; G02B 6/3664–3676
See application file for complete search history.

(56) References Cited

U.S. PATENT DOCUMENTS

| | | | |
|---|---|---|---|
| 5,844,239 A | 12/1998 | Kimura | |
| 6,041,154 A | 3/2000 | Ono et al. | |
| 6,367,989 B1 * | 4/2002 | Hartman | H04B 10/801 |
| | | | 385/115 |
| 6,487,351 B1 | 11/2002 | Cryan et al. | |

(Continued)

FOREIGN PATENT DOCUMENTS

WO WO 2017/139317 8/2018

OTHER PUBLICATIONS

International Search Report from International Searching Authority (KIPO) in related PCT Application No. PCT/US2022/072100 dated Aug. 30, 2022.

(Continued)

*Primary Examiner* — Rhonda S Peace

(57) ABSTRACT

An optical interconnect may provide for optical communications between two IC chips. The optical interconnect may include an array of optoelectronic elements, for example microLEDs and photodetectors, with the array including a plurality of sub-arrays. A fiber bundle of optical fibers may couple the optoelectronic elements, and the fiber bundle may include a plurality of sub-bundles, with for example one sub-bundle for coupling pairs of sub-arrays. Fibers of each sub-bundle may be accurately positioned with respect to one another.

15 Claims, 10 Drawing Sheets

(56) References Cited

U.S. PATENT DOCUMENTS

| | | | | |
|---|---|---|---|---|
| 7,939,791 | B1 * | 5/2011 | Stone ................... | G02B 6/4246 |
| | | | | 385/33 |
| 9,063,313 | B1 * | 6/2015 | Hasharoni ................ | G02B 6/43 |
| 9,817,191 | B2 * | 11/2017 | Kopp ..................... | G02B 6/024 |
| 9,964,723 | B1 * | 5/2018 | Stone ..................... | G02B 6/262 |
| 10,107,979 | B2 | 10/2018 | Sales Casals et al. | |
| 11,327,250 | B1 * | 5/2022 | Stone ........................ | G02B 6/40 |
| 11,476,942 | B2 * | 10/2022 | Kalman ................. | H04B 10/40 |
| 11,764,878 | B2 * | 9/2023 | Pezeshki .............. | H04B 10/803 |
| | | | | 398/164 |
| 11,822,135 | B2 * | 11/2023 | Kalman ............... | G02B 6/4249 |
| 2002/0181058 | A1 * | 12/2002 | Ger ...................... | H04B 10/801 |
| | | | | 398/164 |
| 2006/0198585 | A1 | 9/2006 | Keller et al. | |
| 2007/0058976 | A1 | 3/2007 | Tatum et al. | |
| 2015/0341113 | A1 * | 11/2015 | Krug ................... | H04B 10/116 |
| | | | | 398/118 |
| 2017/0184791 | A1 | 6/2017 | Kopp et al. | |
| 2024/0045155 | A1 * | 2/2024 | Kalman ............... | G02B 6/4249 |

OTHER PUBLICATIONS

Written Opinion from International Searching Authority (KIPO) in related PCT Application No. PCT/US2022/072100 dated Aug. 30, 2022.

Extended European Search Report by European Patent Office (EPO) in related EP Application No. 22808500.7 dated Dec. 20, 2024.

Bockstaele et al., "A Parallel Optical Interconnect Link With On-Chip Optical Access", Micro-Optics, VCSELs, and Photonic Interconnects, Proceedings of SPIE, vol. 453, Photonics Europe, Apr. 26-30, 2004.

Liang et al., "Hybrid Integrated Platforms for Silicon Photonics", Materials 2010, vol. 3, pp. 1782-1802, Match 12, 2010.

Roelkens et al., "III-V/Silicon Photonics for On-chip and Inter-chip Optical Interconnects", Laser Photonics Review 4, No. 6, pp. 751-779, Jan. 11, 2010.

Rooman et al., "Asynchronous 250-Mb/s Optical Receivers with Integrated Detector in Standard CMOS Technology for Optocoupler Applications", IEEE Journal of Solid-State Circuits, vol. 35, No. 7, Jul. 2000.

Rooman et al., "High-Efficiency AlGaInP Thin-Film LEDs Using Surface-Texturing and Waferbonding with Conductive Epoxy", IEEE Photonics Technology Letters, vol. 17, No. 12, Dec. 2005.

Rooman et al., "Inter-Chip Optical Interconnects Using Imaging Fiber Bundles and Integrated CMOS Detectors", Proceedings 27th 27th European Conference on Optical Communication (ECOC), pp. 296-297, Sep. 30, 2001-Oct. 4, 2001.

Rooman et al., "Low-Power Short-Distance Optical Interconnect using Imaging Fibre Bundles and CMOS Detectors", IEEE Proceedings, 2000 Digest of the LEOS Summer Topical Meetings, Jul. 24-28, 2000.

Windisch et al., "Large-Signal-Modulation of High-Efficiency Light-Emitting Diodes for Optical Communication", IEEE Journal of Quantum electronics, vol. 36, No. 12, Dec. 2000.

Windisch et al., "Light-Extraction Mechanisms in High-Efficiency Surface-Textured Light-Emitting Diodes", IEEE Journal on selected Topics in Quantum Electronics, vol. 8, No. 2, Mar./Apr. 2002.

Office Action from the China National Intellectual Property Administration (CNIPA) in related CN Application No. 202280032589.6 dated Apr. 23, 2026.

* cited by examiner

811

813b

813a

1031

1033

1037

1035

1011

1015

1011

1013

MULTI-ARRAY PARALLEL OPTICAL LINKS

CROSS-REFERENCE TO RELATED APPLICATIONS

This application is a continuation of U.S. patent application Ser. No. 17/662,002, filed on May 4, 2022, which claims the benefit of U.S. Provisional Patent Application No. 63/186,706, filed on May 10, 2021, the disclosures of which are incorporated by reference herein.

FIELD OF THE INVENTIONS

The present invention relates generally to semiconductor chip-to-chip communications and more particularly to optical interconnects between semiconductor chips in different semiconductor packages.

BACKGROUND OF THE INVENTION

Computing and networking performance requirements are seemingly ever-increasing. Prominent applications driving these requirements include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple ICs.

However, Moore's Law appears to be reaching its limits as shrinking feature sizes below 10 nm results in decreasing marginal performance benefits with decreased yields and increased per-transistor costs. Beyond these limitations, a single IC can only contain so much functionality, and that functionality is constrained because the IC's process cannot be simultaneously optimized for different functionality, e.g., logic, DRAM, and I/O. Increasingly, improving system performance is dependent on implementing very high bandwidth interconnects between multiple ICs.

Unfortunately, compared to the on-chip connections, today's chip-to-chip connections are typically much less dense and require far more power (for example normalized as energy per bit). These inter-IC connections are currently significantly limiting system performance. Specifically, the power, density, latency, and distance limitations of interconnects are far from what is desired.

New interconnect technologies that provide significant improvements in multiple performance aspects are highly desirable. It is well-known that optical interconnects may have fundamental advantages over electrical interconnects, even for relatively short interconnects of <<1 meter. Unfortunately, implementation of optical interconnects for inter-IC connections may face a host of problems. Included in these problems is that of coupling light from one IC to another IC. Electrical interconnect technology for inter-IC communications at a substrate or circuit board level may be relatively well-developed. The same may not be as true for optical interconnect technology for inter-IC communications, particularly for high-throughput applications that preferably do not negatively impact existing modes of electrical interconnections.

BRIEF SUMMARY OF THE INVENTION

Some embodiments of a parallel optical interconnect provide: a first optical transceiver array comprising a plurality of optical transmitters and receivers, a first optical coupling assembly for optically coupling the first optical transceiver array to a first end of a fiber bundle, the fiber bundle comprising a plurality of fiber cores, a second optical transceiver array, and a second optical coupling assembly for optically coupling that second array to a second end of the fiber bundle. In some embodiments the first optical transceiver array comprises a plurality of transceiver sub-arrays. In some embodiments each transceiver sub-array comprises a plurality of light emitters and a plurality of photodetectors. In some embodiments the light emitters are microLEDs. In some embodiments the fiber bundle comprises a plurality of fiber sub-bundles, each fiber sub-bundle comprising a plurality of fiber cores. In some embodiments adjacent fiber cores in a fiber sub-bundle are arranged closer in space than adjacent fiber cores in different fiber sub-bundles. In some embodiments there is a one-to-one correspondence between transceiver sub-arrays of a transceiver array and fiber sub-bundles of a fiber bundle. In some embodiments emitters of one optical transceiver array are paired with photodetectors of another optical transceiver array. In some embodiments there is a one-to-many correspondence between fiber cores and emitter/photodetector pairs. In some embodiments there is a one-to-one correspondence between fiber cores and emitter/photodetector pairs.

In some embodiments of a parallel optical interconnect, each optical transceiver array comprises one or more transceiver sub-arrays, where each sub-array comprises a plurality of optical transmitter and receivers. In some embodiments, the fiber bundle comprises an array of sub-bundles, where each sub-bundle comprises a plurality of fiber cores. In some embodiments, the shape and position of the fiber-sub-bundles is matched to that of the transceiver sub-arrays such that each transceiver sub-array is coupled to one end of a corresponding fiber sub-bundle.

In some embodiments, the transceiver sub-arrays and fiber sub-bundles may be arranged on a two-dimensional grid. In some embodiments the grid may be a regular grid on a square grid, hexagonal close-packed (HCP, equivalent to an equilateral triangle grid) grid, some other regular polygonal grid, or may be an irregular grid. In some embodiments there may be a gap between sub-arrays. In some embodiments the sub-arrays may be contiguous.

In some embodiments, each transceiver sub-array and ends of each fiber sub-bundle may define an approximately square or rectangular shape. In some embodiments, each sub-array and ends of each sub-bundle may define an approximately hexagonal shape. In some embodiments, each sub-array and ends of each sub-bundle may define an approximately triangular shape. In some embodiments, each sub-array may define a shape that is rotationally asymmetric. Such rotationally asymmetric sub-arrays may lend themselves more easily to being accurately oriented rotationally.

In some embodiments, each sub-array may comprise a mix of one or more transmitters and one or more receivers. In some embodiments, each sub-array may comprise just transmitters or just receivers. In some embodiments, each sub-array may comprise an equal number of transmitters and receivers. In some embodiments, each sub-array may comprise an unequal number of transmitters and receivers. In some such embodiments a number of transmitters may be a multiple of a number of receivers. In some such embodiments, each sub-array may comprise a number of emitters that is a multiple of a number of detectors.

Some aspects of the invention provide an optical interconnect, comprising: a first IC chip having a first plurality of sub-arrays of optoelectronic elements; a second IC chip having a second plurality of sub-arrays of optoelectronic elements; and a fiber bundle including a plurality of fiber sub-bundles, each of the fiber sub-bundles comprised of a plurality of fibers, each of the plurality of fibers including a core concentrically surrounded by cladding, with optoelectronic elements of different ones of the first plurality of sub-arrays of optoelectronic elements optically coupled to optoelectronic elements of different ones of the second plurality of sub-arrays by fiber elements of different ones of the fiber sub-bundles; with fiber elements of each fiber sub-bundle arranged on a grid.

In some aspects, each fiber sub-bundle comprises in inner region containing the fiber elements and an outer region, the outer region having dimensions that are independent of variations in size and position of the fiber elements of the fiber sub-bundle. In some aspects the grid is a hexagonal close packed grid. In some aspects the grid is a square grid. In some aspects the optoelectronic elements comprise microLEDs and/or photodetectors. In some aspects the sub-bundles are accurately positioned relative to each other only near the fiber element ends. In some aspects the fiber bundle includes at least one fiducial feature.

Some aspects further comprise a first substrate with a plurality of apertures and a second substrate with a plurality of apertures, each of the plurality of apertures of the first substrate holding first ends of corresponding ones of the fiber sub-bundles and each of the plurality of apertures of the second substrate holding second ends of the corresponding one of the fiber sub-bundles. In some such aspects the apertures are rotationally asymmetric.

Some aspects further comprise filler material between fiber elements of each fiber sub-bundle.

In some aspects ends of the fiber bundles are circumferentially encased by an outer jacket. In some such aspects the outer jacket includes a flat edge, allowing for determination of rotational orientation of the fiber bundle.

These and other aspects of the invention are more fully comprehended upon review of this disclosure.

DETAILED DESCRIPTION

Figure 1A:
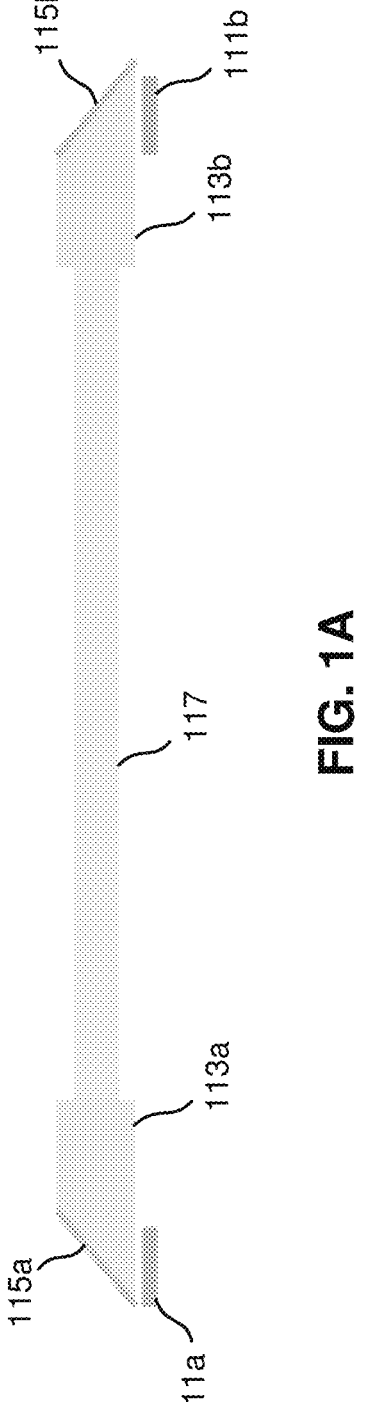
FIG. 1A shows a parallel optical interconnect using a fiber bundle, in accordance with aspects of the invention.

FIG. 1A shows a parallel optical interconnect using a fiber bundle. The parallel optical interconnect may connect two semiconductor packages. The semiconductor packages may be packages for a single semiconductor chip, or, in many embodiments, may be packages of multi-chip modules. The packages each include a transceiver array 111a,b. Each transceiver array may include light emitters and/or photodetectors on a top side (as illustrated in FIG. 1A) of an integrated circuit chip or die (which may be referred to as an IC). In some embodiments the photodetectors may be integrated into the IC. The IC may be a separate transceiver IC in the package, or the IC may be an IC with other functions, for example processing or memory functions.

The light emitters and photodetectors are positioned for, respectively, provision or reception of light in a direction towards or from what may be considered a top of their respective packages. Coupling optics 113a,b within the package, however, direct the light so that the light transfers instead through a connection in a side wall of the packages. The coupling optics may include, for example, a turning mirror 115a,b to change a direction of the light from a vertical direction to a horizontal direction. Transfer of the light through the connection in the side wall of the packages may be beneficial in avoiding interference with placement of heat transfer elements that may be present on a top side of the packages, for example.

A fiber bundle 117 couples to the coupling optics of each of the semiconductor packages. The fiber bundle includes a plurality of fiber cores for transfer of light between opposing ends of the fiber bundle, and thence to and from the coupling optics. The fiber bundle may include a plurality of sub-bundles, each of which includes a plurality of fiber cores. In some embodiments light emitters and/or photodetectors in each package are arranged in an array, with each array including a plurality of sub-arrays of light emitters and/or photodetectors. In some embodiments each sub-array is associated with a corresponding fiber sub-bundle, with the fiber sub-bundle carrying light for that sub-array.

Figure 1C:
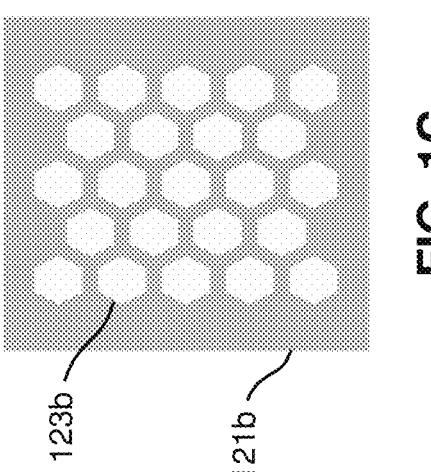
FIGS. 1B and 1C show top views of embodiments of a transceiver IC, in accordance with aspects of the invention.
Figure 1B:
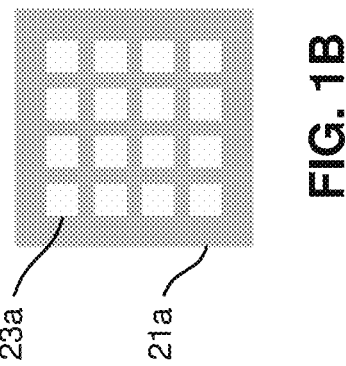

FIGS. 1B and 1C show top views of embodiments of a transceiver IC 121a,b. The transceiver ICs may be a transceiver IC as discussed with respect to FIG. 1A. The transceiver ICs include a plurality of sub-arrays 123a,b of light emitters and/or photodetectors on a top of the transceiver IC. In FIG. 1B, the sub-arrays define a square shape for an array of light emitters and/or photodetectors. In some embodiments the sub-arrays (and array) may instead define a rectangular shape. In FIG. 1C, the sub-arrays define a hexagonal shape.

Figures 2A, 2B:
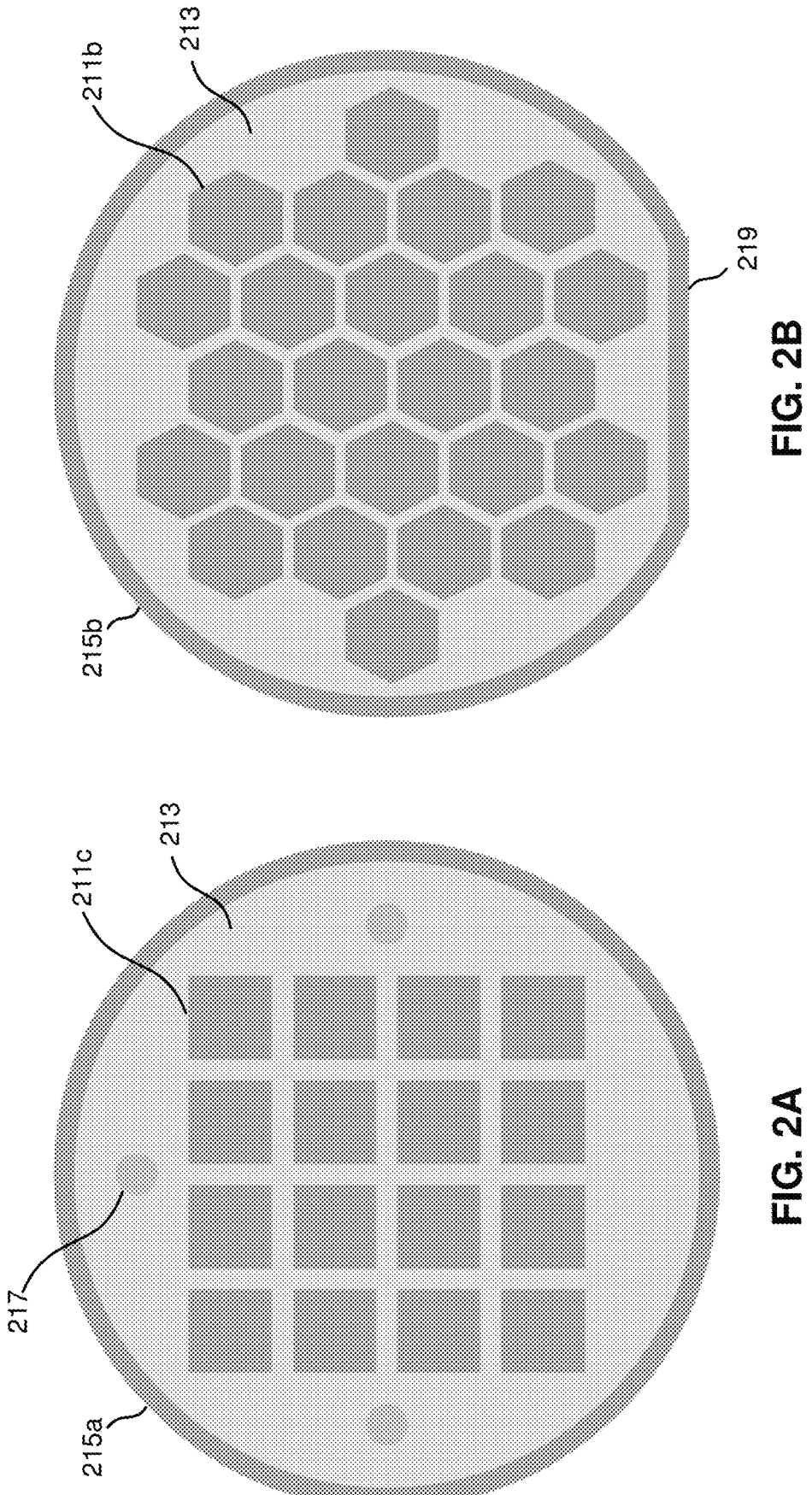
FIGS. 2A and 2B show example ends of fiber bundles, in accordance with aspects of the invention.

FIGS. 2A and 2B show example ends of fiber bundles. In both FIGS. 2A and 2B, a plurality of fiber sub-bundles 211a,b are surrounded by filler material 213. The sub-bundles and filler material are circumferentially encased by an outer jacket 215a,b. The ends of the sub-bundles of FIGS. 2A and 2B define shapes corresponding to the shapes of the sub-arrays of FIGS. 1B and 1C, respectively. In FIG. 2A, ends of the sub-bundles define a square shape, with the square shapes of the sub-bundles in turn defining a square shape for cores of the fiber bundle. In FIG. 2B, ends of the sub-bundles define hexagonal shapes. The outer jacket may define a circular shape in some embodiments, and as illustrated in FIG. 2A. In some embodiments the outer jacket may include a flat edge 219, for example as illustrated in FIG. 2B. The use of the flat edge may be beneficial in, for example, allowing for determination of rotational orientation of the fiber bundles, which may provide for increased ability to align ends of the sub-bundles with corresponding emitter and/or photodetector sub-arrays.

In some embodiments, the fiber bundle may comprise fiducial features that allow the rotational and/or translational orientation of the fiber bundle to be uniquely determined. In some embodiments, the outer profile of the fiber bundle may include one or more fiducial markers. In some embodiments, ends of the fiber bundle may include one or more fiducial markers 217, for example as shown in FIG. 2A. The fiducial markers may be, in some embodiments, differently colored elements, that enable visual determination of the unique rotational and/or translational orientation of the fiber bundle.

Figure 3:
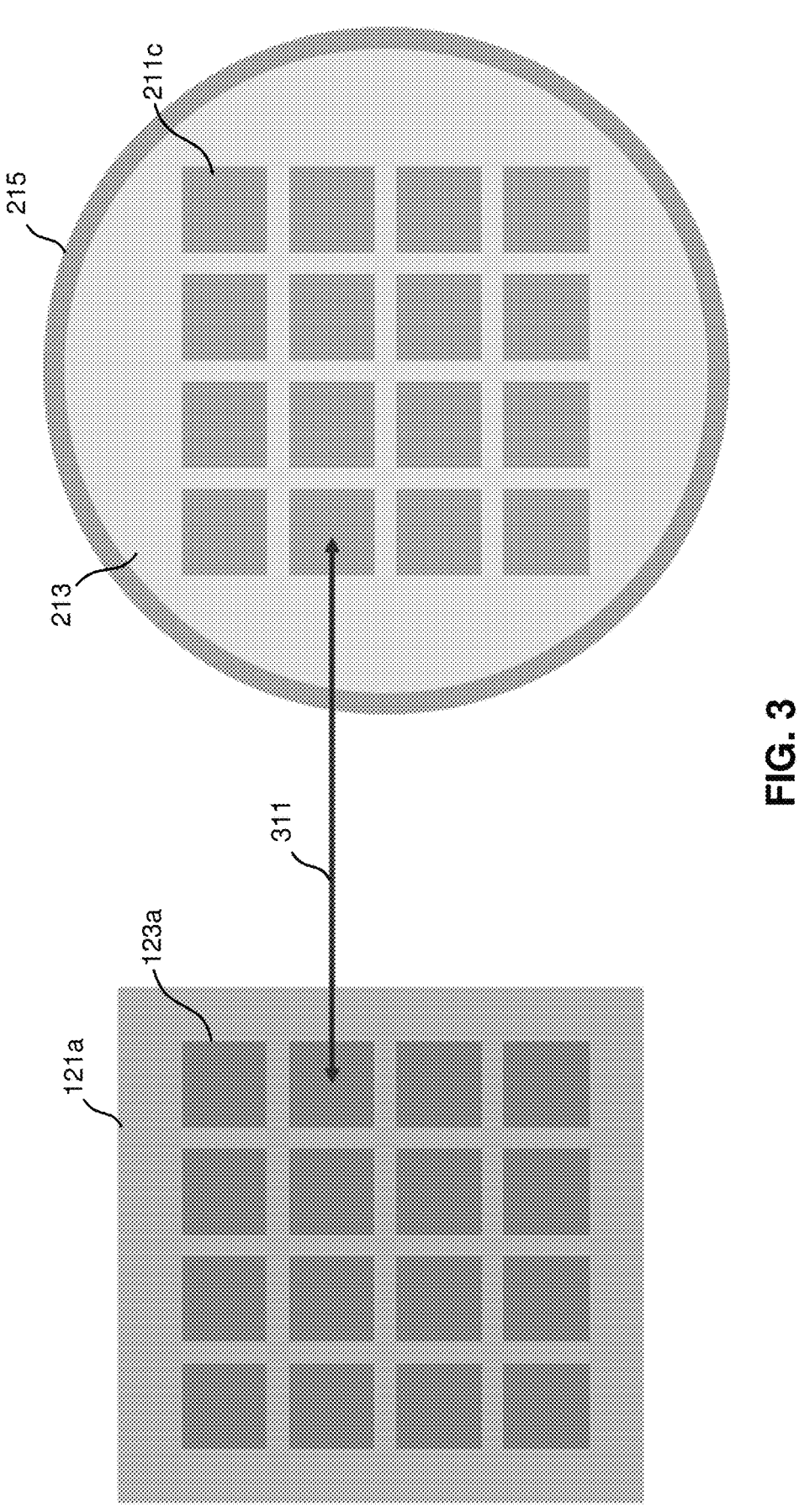
FIG. 3 shows an example matching of light emitter and/or detector sub-arrays with sub-bundles of a fiber bundle, in accordance with aspects of the invention.

FIG. 3 shows an example matching of light emitter and/or detector sub-arrays with sub-bundles of a fiber bundle. In FIG. 3, a plurality of square-shaped sub-arrays 123a of a transceiver IC are each associated with a corresponding fiber sub-bundle 211c of a fiber bundle, for example as indicated by arrow 311 marking an association between one of emitter and/or detector sub-arrays and one of the fiber sub-bundles. As in FIG. 2A, the fiber bundle includes a plurality of fiber sub-bundles, arranged in a square array, with the sub-bundles longitudinally surrounded by filler material 213. An outer jacket 215 circumferentially bounds the sub-bundles and filler material. In some embodiments a single fiber core of the sub-bundle receives light from a single emitter of the sub-array or passes light to a single detector of the sub-array. In embodiments such as the embodiment of FIG. 1A, the single fiber core may have a first end for doing so for an emitter or detector of the transceiver array of a first IC and a second end for doing so for an emitter or detector of the transceiver array of a second IC.

Figures 4A, 4B, 4C, 4D:
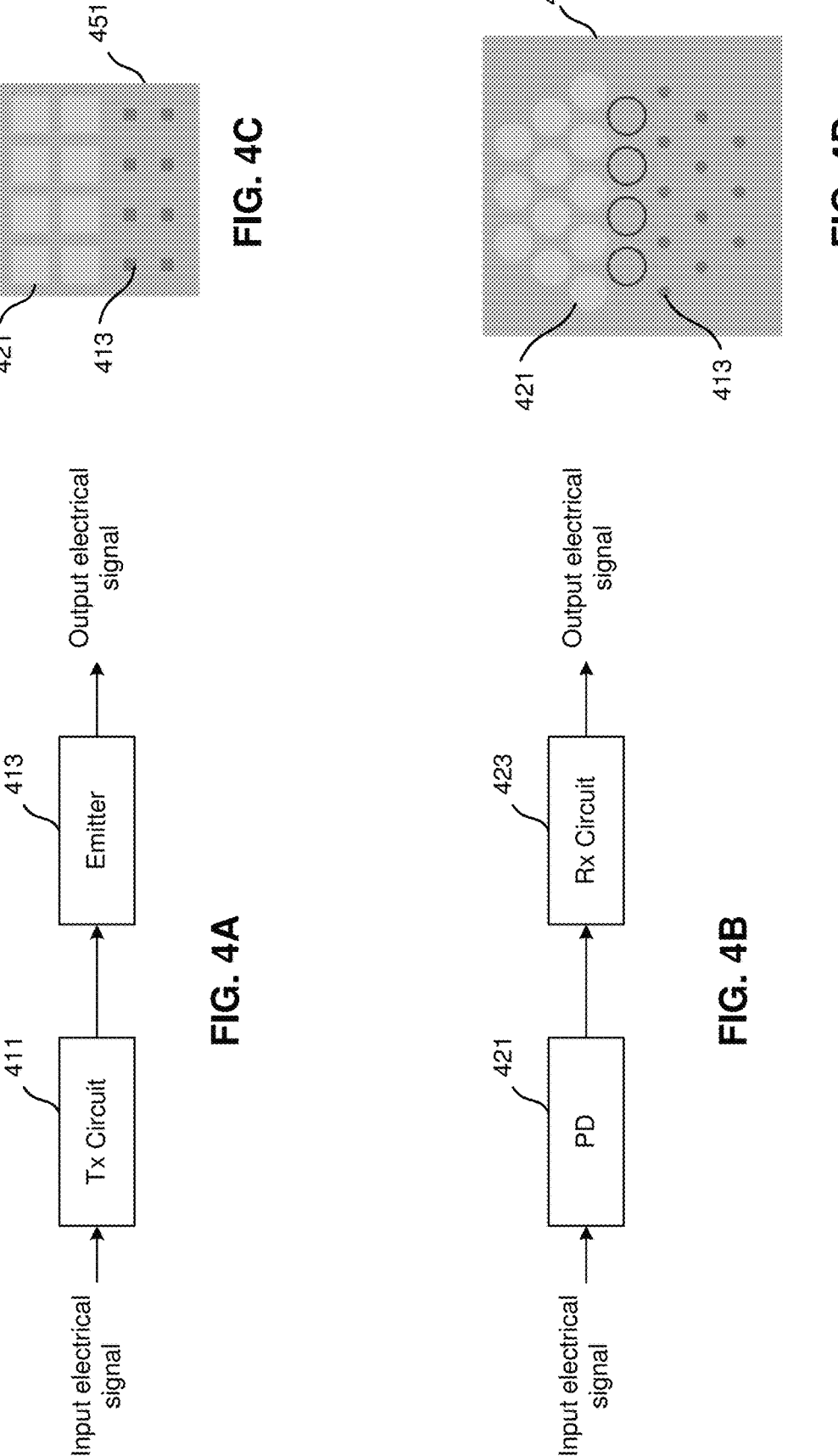
FIG. 4A and FIG. 4B are block diagrams of a transmitter and of a receiver, respectively, in accordance with aspects of the invention.
FIGS. 4C and 4D are top views of transceiver ICs, or portions of transceiver ICs, showing example layouts of optoelectronic elements, in accordance with aspects of the invention.

FIG. 4A is a block diagram of a transmitter. In some embodiments each transmitter comprises an optical emitter 413 and transmitter circuitry 411. The transmitter circuitry receives an input electrical signal, for example a data signal or data signals. In some embodiments the transmitter circuitry drives the emitter to encode the data signal or data signals into light signals emitted by the emitter. In some embodiments, the transmitter emitter elements are microLEDs. In some embodiments the microLEDs are comprised, for instance, of GaN, GaAs, or InP. In some embodiments each transmitter circuit may comprise an emitter driver and an equalizer. In some embodiments the equalizer may compensate the frequency response of the emitter being driven, for instance compensating for the high-frequency roll-off of the emitter frequency response.

FIG. 4B is a block diagram of a receiver. In some embodiments each receiver comprises a photodetector (PD) 421 and receiver circuitry 423. The PD converts light signals into electrical signals, which are processed by the receiver circuitry, for example to amplify and in some embodiments equalize the electrical signals. In some embodiments, the PD may be comprised, for instance, of Si, Ge, GaAs, SiGe, or InP. Each PD generates a photocurrent in response to light received from a transmitter, so the PD material preferably should be chosen to be sensitive in the wavelength range emitted by the transmitters. In some embodiments the transmitters emit light in a blue wavelength range. In some embodiments the transmitters emit light in a wavelength range of 250 nm to 700 nm. In some embodiments the transmitters emit light in a wavelength range of 375 nm to 600 nm. In some embodiments the transmitters emit light in a wavelength range of 400 to 500 nm. In some embodiments, the PDs may be silicon photodetectors, for instance p-i-n photodetectors or avalanche photodiodes. In some embodiments each receiver circuit may comprise a transimpedance amplifier (TIA), a limiting amplifier, a buffer amplifier to drive output loads, and an equalizer, for example to compensate the link frequency response, for instance to increase the bit rate the link can support.

The optical emitters and photodetectors may be referred to collectively as "optoelectronic elements" herein. FIGS. 4C and 4D are top views of transceiver ICs, or portions of transceiver ICs, showing example layouts of optoelectronic elements. In FIG. 4C, a transceiver IC 451, or a portion of a transceiver IC, includes emitters 413 and PDs 421 arranged in a rectangular pattern, with two rows of PDs followed by two rows of emitters shown in FIG. 4C. In FIG. 4D, transceiver IC 451, or a portion of a transceiver IC, includes emitters 413 and PDs 421 arranged in a hexagonal close packed (HCP) grid, with rows of PDs followed by rows of emitters. In some embodiments, accordingly, the optoelectronic elements in a sub-array may be arranged in a regular pattern, e.g., a square, rectangular, or HCP. In some embodiments, and as shown in FIGS. 4C and 4C, emitter widths are smaller than PD widths. Smaller emitter widths may allow for higher coupling efficiency to the fiber bundle using per-emitter collection optics that preserve source etendue by allowing the beam to expand while reducing its angular spread. Using PDs with large widths may enable relaxed (i.e., larger) translational alignment tolerances for the PDs relative to the fiber bundle. In some embodiments, some subset of the optoelectronic elements may be on a regular grid with some omitted elements. For example, FIG. 4D shows PD and emitter elements on a HCP grid with some omitted elements between the PDs and emitters.

Figure 5A:
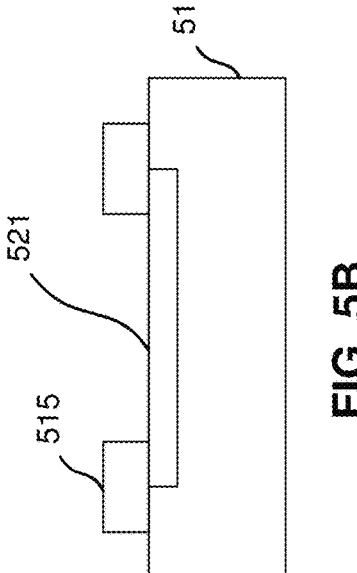
FIGS. 5A-D show emitter and photodetector structures on or in an IC, in accordance with aspects of the invention.
Figure 5B:
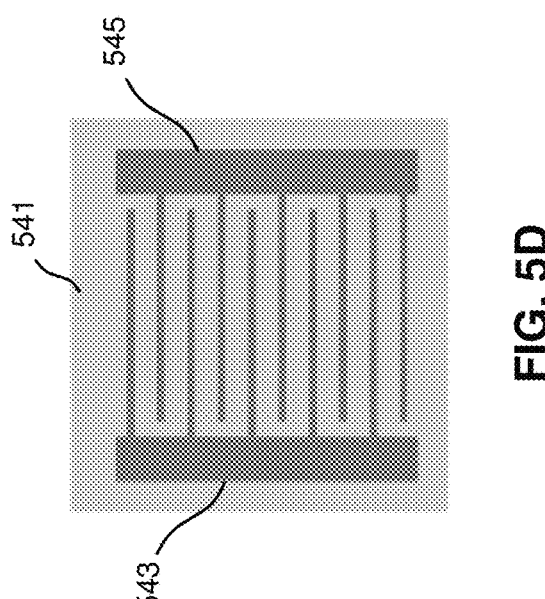
Figure 5C:
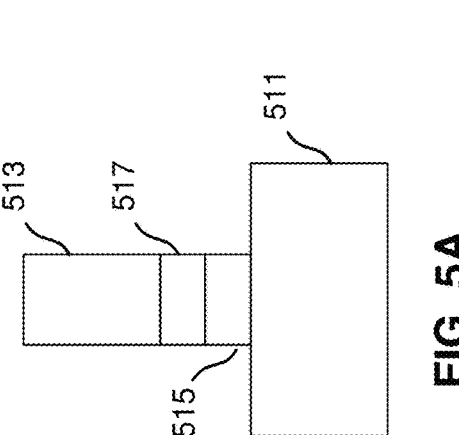
Figure 5D:
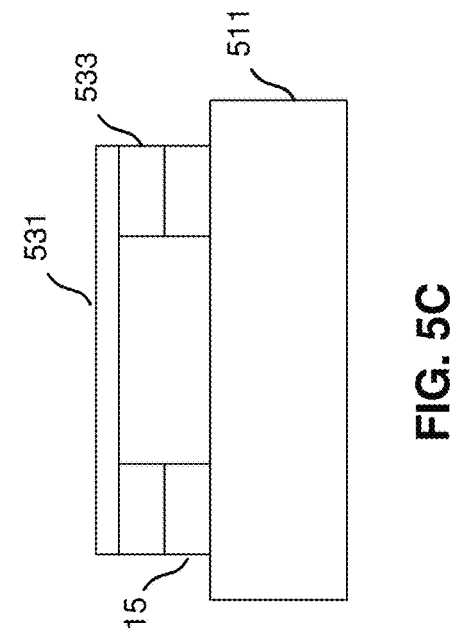

FIGS. 5A-D show emitter and photodetector structures on or in an IC, in accordance with aspects of the invention. In some embodiments, the transceiver array may comprise a substrate; in some embodiments, the substrate comprises an IC, where the IC comprises one or more instances of transmitter and a receiver circuitry. In some embodiments of a transceiver array, each emitter may be attached to the IC. FIG. 5A shows a cross-sectional view of an example emitter. The emitter may be, for instance, a microLED 513 solder-bonded 517 to an IC pad 519, of a top metal layer 515 of an IC 511. The emitter may be driven by a transmitter circuit, for example the transmitter circuit of FIG. 4A. In some embodiments, the emitters emit light preferentially in a direction normal to the IC surface. In some embodiments, one or more optical elements such as a lens and/or reflector structure are attached to or coupled to the IC surface, or in or to a structure attached to or coupled to the IC surface, in the vicinity of each emitter. In some embodiments the optical element(s) and help to collect light from each emitter such that angular spread of optical distribution of light from each emitter is reduced.

FIG. 5A illustrates a cross-section of a PD monolithically integrated in an IC. The PD 521 may be in a top of the IC 511. An IC top metal layer 515 may provide electrical connections to the PD, with in some embodiments the top metal layer not blocking or substantially not blocking light from reaching the PD. An output of the PD may be connected to a TIA input (not shown in FIG. 5A), which may be in the IC. Such an embodiment may be especially useful for materials in which high-performance, high-density, low-cost electronics are available such as silicon. In other embodiments, for example as illustrated in the cross-section of FIG. 5C, each receiver in the IC 511 comprises a PD 531 that is bonded to the IC, for instance using solder 533 coupled to the top metal layer 515 of the IC. One of the PD pads may be electrically connected to an input of a TIA in the IC. In some embodiments, for example as illustrated in a top view of FIG. 5D, the PDs in an IC 541 may utilize a lateral structure with interdigitated fingers extending from an n-contact 545 and a p-contact. In some embodiments, optical elements such as a lens and/or reflector structure are attached to or coupled to the IC surface in the vicinity of each PD and help to collect light from an area larger than that of the PD and cause that light to be incident on the PD's surface.

Figure 6D:
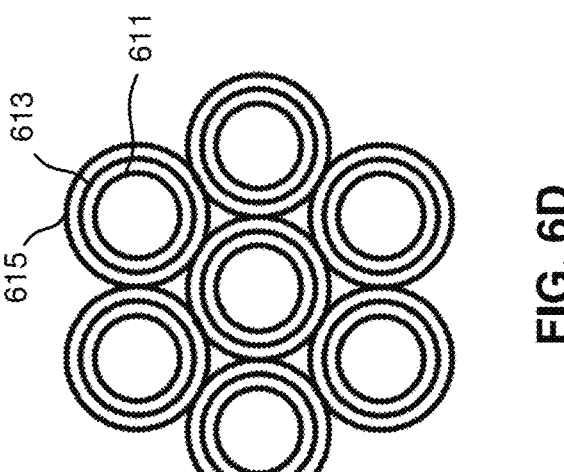
FIGS. 6A-D illustrate cross-sections of single core fibers and fiber sub-bundles.
Figure 6C:
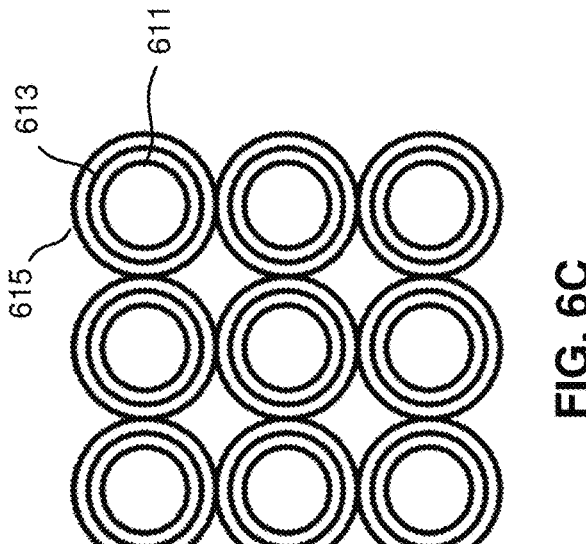
Figure 6A:
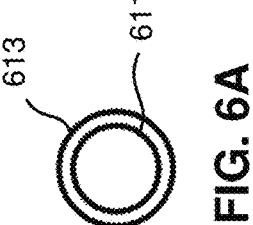

In some embodiments, the fiber bundle comprises a plurality of single-core fiber elements (FEs) arranged in a bundle. FIG. 6A illustrates a cross-section of a single core fiber. In some embodiments each single core fiber comprises a circular core 611 concentrically surrounded by a cladding 613, where the refractive index of the cladding is less than that of the core such that light coupled into the core is guided down the core via total internal reflection for light rays that are incident on the core-cladding interface at an angle (relative to the interface normal) that is greater than a "critical" angle, beyond which light rays experience total internal reflection (TIR). The fiber core and cladding may be made from a glass, or may be made from some other material such as a polymer.

Figure 6B:
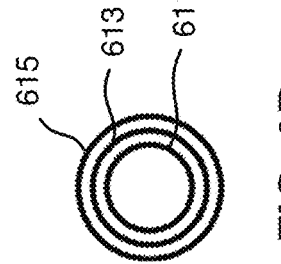

In some embodiments, each FE additionally comprises a jacket 615 that concentrically surrounds the cladding, as illustrated in the cross-section of FIG. 6B. This jacket may be made from a variety of materials, for instance glass or a polymer.

In some embodiments, a fiber bundle comprises one or more "sub-bundles." In some embodiments each sub-bundle is a fiber bundle as described previously. In some embodiments, the FEs within each bundle or sub-bundle are arranged on a grid that is approximately square, for example as illustrated in FIG. 6C. In some embodiments, the FEs within a bundle or sub-bundle are arranged on a HCP grid, for example as illustrated in FIG. 6D.

Figure 7B:
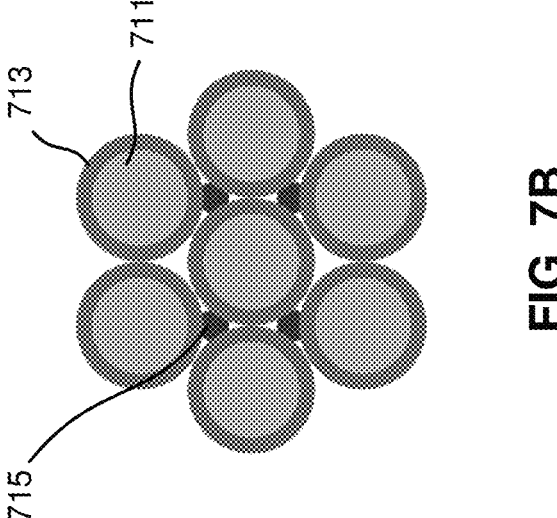
FIGS. 7A and 7B illustrate a cross-section of a sub-bundle in a square-packed grid and a cross-section of a sub-bundle in a HCP grid, respectively, with filler material between fiber elements, in accordance with aspects of the invention.
Figure 7A:
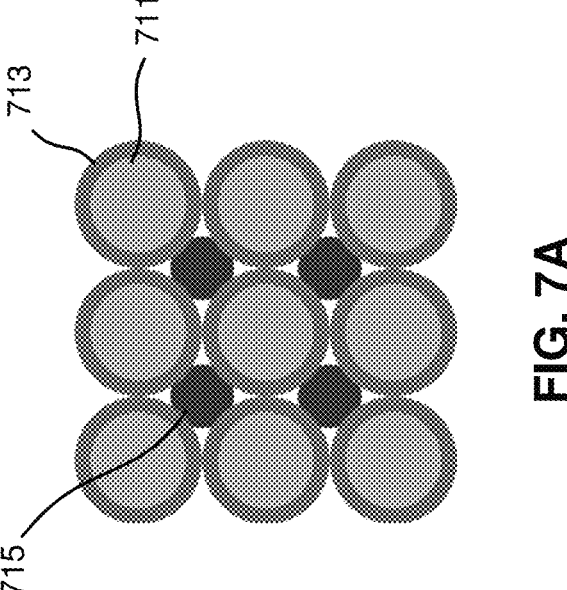

In some embodiments, the bundle (or sub-bundle) of FEs is fabricated in a manner such that the cladding of adjacent fibers is slightly melted together to adhere the FEs to each other. In some embodiments, additional filler material occupies some or all of the space between the FEs. FIGS. 7A and 7B illustrate a cross-section of a sub-bundle in a square-packed grid and a cross-section of a sub-bundle in a HCP grid, respectively, with filler material 715 between fiber elements. The fiber elements generally include a core concentrically surrounded by cladding 713. In some embodiments, the additional filler material between the FEs is approximately circular in cross-section. This filler material may be a glass, a polymer, or some other material.

In some embodiments, the diameter of each FE core is in the range of 1 um to 10 um. In some embodiments, the diameter of each FE core is in the range of 10 um to 100 um. In some embodiments, the diameter of each FE core is greater than 100 um. In some embodiments, the ratio of the cladding diameter to the core diameter for each FE is in the range of 1.0 to 1.2. In some embodiments, the ratio of the cladding diameter to the core diameter for each FE is >1.2.

In some embodiments, the ratio of the jacket diameter to the cladding diameter for each FE is in the range of 1.0 to 1.2. In some embodiments, the ratio of the jacket diameter to the cladding diameter for each FE is >1.2.

Figure 8:
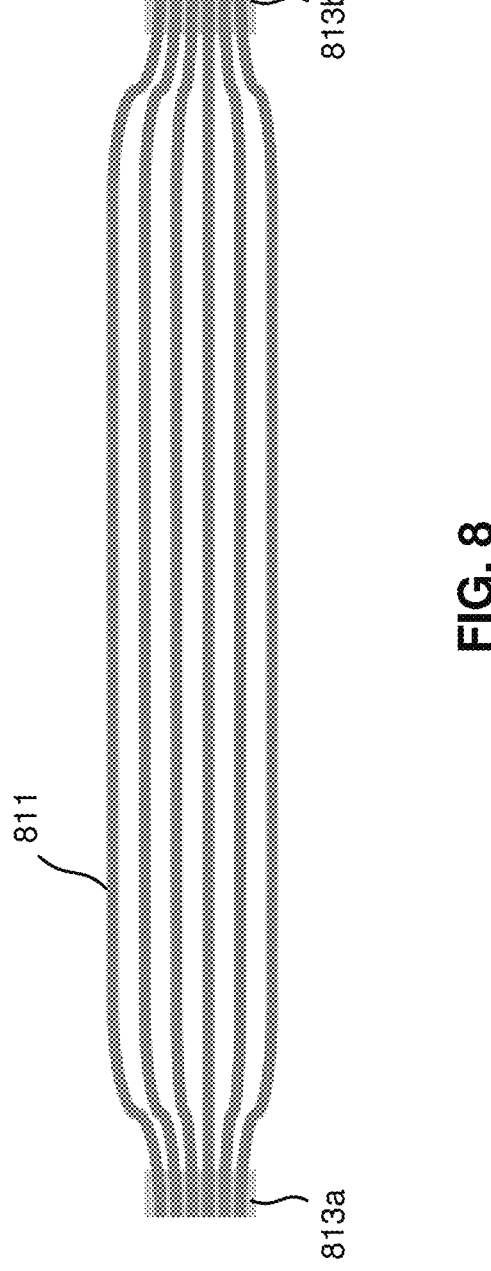
FIG. 8 illustrates a fiber bundle comprised of a plurality of sub-bundles 811 with attachment structures about opposing ends of the fibers of the sub-bundles, in accordance with aspects of the invention.

In some embodiments of a fiber bundle comprised of sub-bundles, the sub-bundles are attached to each other only along a limited length near the fiber end faces, and are not attached to each other along other parts of the length of the fiber. FIG. 8 illustrates a fiber bundle comprised of a plurality of sub-bundles 811. In FIG. 8, attachment structures 813*a,b* are about opposing ends of the fibers of the sub-bundles.

In some embodiments of a parallel optical interconnect, the light from each transmitter is coupled into multiple FEs; at the other end of the fiber bundle, the light from the multiple FEs into which a transmitter's light was coupled is coupled to a single PD.

In some embodiments of a parallel optical interconnect, the light from each transmitter is coupled to a single FE; at the other end of the fiber bundle, the light from the FE is coupled to a single PD. In such embodiments, each FE preferably is accurately positioned relative to the transceiver element (emitter or PD) to which it is optically coupled. In turn, each sub-bundle comprising an overall fiber bundle preferably is accurately positioned with respect to transceiver elements or sub-arrays.

The fiber bundles discussed above may be formed by stacking fibers in various ways. Variances in the diameter and position of each FE may cause significant variance in location of a given core in a fiber bundle relative to its "ideal" position on a grid due to accumulated errors across the bundle. As the number of fibers within a bundle is increased, the accumulated position error for each core grows. If there is a maximum core positioning error requirement, this may limit the maximum useful number of FEs in a bundle.

These FE variances can also cause the cross-sectional size of a fiber sub-bundle to vary from its designed size. Similar to the problem of accumulated FE size/position errors within each sub-bundle, creating a fiber bundle by stacking multiple fiber sub-bundles can cause an accumulated error in the position of each sub-bundle relative to its ideal position. This error is added to the FE position error within a sub-bundle and can quickly result in large positioning errors for the FEs within each bundle relative to an "ideal" grid.

For a fiber bundle comprised of multiple sub-bundles, the error in position of each sub-bundle can be minimized by using a mechanism for positioning each sub-bundle that does not depend on the positions of other sub-bundles. In some embodiments of a fiber bundle comprised of an array of sub-bundles, the sub-bundles may be separated by a filler material, for example as discussed with respect to FIGS. 7A, B. In some embodiments, the width of the filler material may be adjusted to offset any variance in cross-sectional size of each sub-bundle relative to the designed size of that sub-bundle such that each sub-bundle is accurately positioned relative to its "ideal" position.

In some embodiments, the sub-bundles are accurately positioned relative to each other only over a limited length near the fiber end faces, for example as discussed with respect to FIG. 8, while the rest of the length of the sub-bundles are not tightly attached to each other such that their positions relative to each other may change as the fiber is moved or manipulated.

Figures 9A, 9B, 9C:
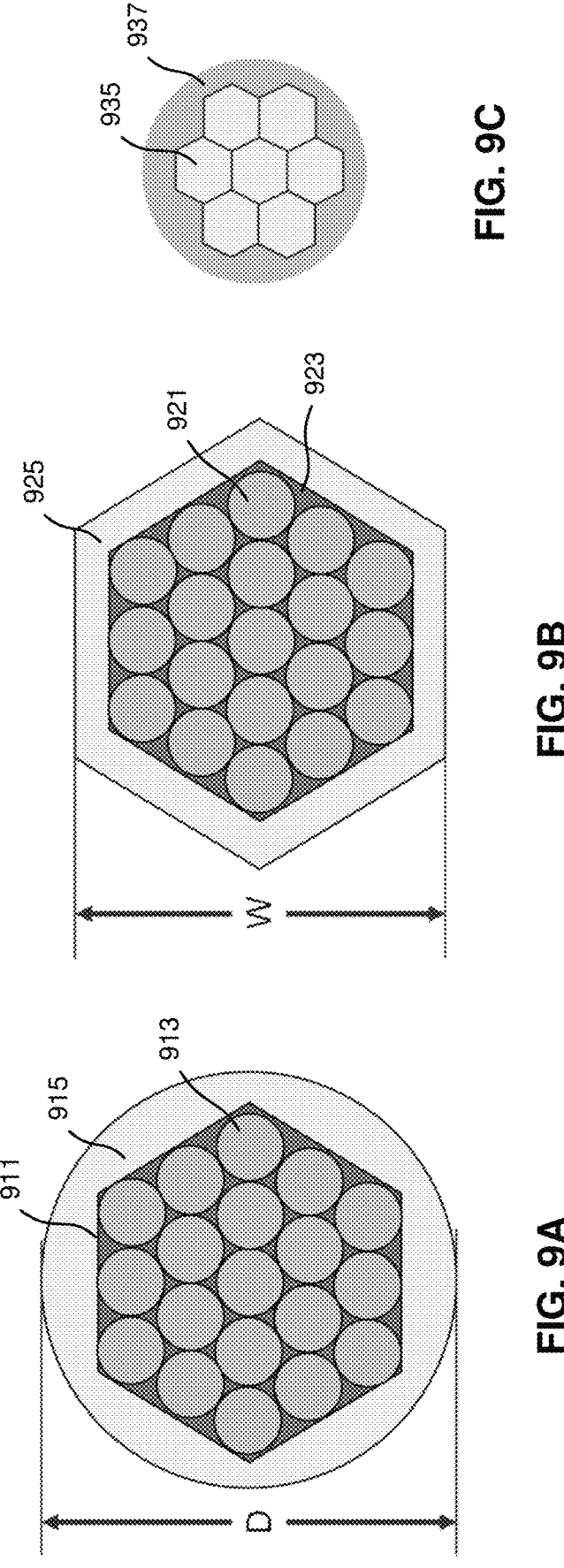
FIGS. 9A-C illustrate fiber sub-bundles with defined outer dimensions, in accordance with aspects of the invention.

In some embodiments, each sub-bundle comprises an inner region that contains the FEs and an outer region with accurate outer dimensions that are independent of variations in size and position of the FEs comprising the sub-bundle. FIG. 9A shows an embodiment of a sub-bundle comprising an inner region 911 comprising a plurality of FEs 913 and an outer region 915 concentrically surrounding the inner region. The outer region has a circular cross-section of diameter D, where D is independent of the inner region details. FIG. 9B shows an embodiment of a sub-bundle that is similar to FIG. 9A, with an inner region 923 comprised of a plurality of FEs 921, and an outer region 925 concentrically surrounding the inner region. In FIG. 9B, however, the outer region has a hexagonal cross-section of width W that, like the outer region of FIG. 9A, is independent of the details of the inner region. FIG. 9C shows a fiber bundle comprised of an outer region 937 concentrically surrounding sub-bundles 935 of the form of the sub-bundle of FIG. 9B, with accurate outer dimensions. Such a bundle has FE positions that are not impacted by accumulated errors due to FE positions in other sub-bundles. By accurately controlling the outer dimensions of each sub-bundle, fiber bundles with large numbers of FEs can be constructed where the error in the position of each FE relative to an "ideal" grid can be held within a desired bound.

Figures 10A, 10B, 10C:
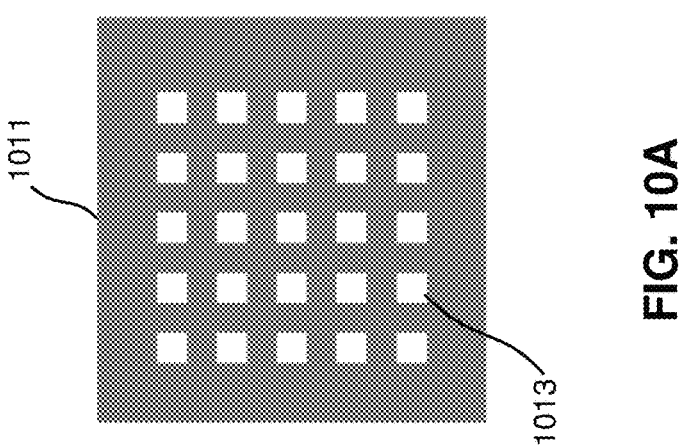
FIGS. 10A-C illustrate example attachment structures for a fiber bundle, in accordance with aspects of the invention.

FIGS. 10A-C illustrate example attachment structures for a fiber bundle. FIGS. 10A and 10B show a face view and a cross-sectional side view, respectively, of a substrate 1011 providing an attachment structure. In some embodiments of a fiber bundle, the end section of each fiber sub-bundle 1015 is inserted into an aperture 1013 in the substrate, where each aperture traverses the substrate thickness. In some embodiments, the size and shape of each aperture may be just slightly larger than that of the sub-bundle it holds such that the position of the sub-bundle is accurately determined by the aperture. If each aperture within the substrate has high positioning accuracy, for example sufficient to align the sub-bundle with an optoelectronic sub-array, this structure can be used to achieve accurate positioning of the end face of each fiber sub-bundle. In some embodiments, each aperture has a circular cross-section. In some embodiments, the aperture cross-section may approximate the sub-bundle cross-section. In some embodiments the apertures and the sub-bundles may be rotationally asymmetric, for example as shown in FIG. 10C. In FIG. 10C, an aperture 1033 in a substrate 1031 is in the form of an irregular convex hexagon, and the sub-bundle cross-section 1037 approximates the irregular convex hexagon. The sub-bundle is comprised of FEs. If the sub-bundle cross-section is rotationally asymmetric and the aperture cross-section approximates that of the sub-bundle, inserting the sub-bundle in the aperture may uniquely rotationally orient the sub-bundle.

In some embodiments, the apertures in the substrate may be arranged on a regular grid, for example as illustrated in FIG. 10A. The grid is in the desired arrangement (e.g., grid shape and spacing) of the sub-bundles. In some embodiments the substrate may be made from silicon, glass, ceramic, polymer, or some other material where apertures can be fabricated with the desired high precision. In the case of a silicon substrate, in some embodiments the apertures may be formed through some standard silicon micromachining process such as deep reactive ion etching (DRIE). In some embodiments each fiber sub-bundle may be fixed in place using an adhesive material applied between the sub-bundle and the substrate.

Although the invention has been discussed with respect to various embodiments, it should be recognized that the invention comprises the novel and non-obvious claims supported by this disclosure.

What is claimed is:

1. An optical interconnect, comprising:
a first IC chip having a first array of optoelectronic elements including a first sub-array of microLEDs and a first sub-array of photodetectors;
a second IC chip having a second array of optoelectronic elements including a second sub-array of microLEDs and a second sub-array of photodetectors; and
a fiber bundle including a plurality of fiber sub-bundles, each of the fiber sub-bundles comprise a plurality of fibers, each of the plurality of fibers including a core concentrically surrounded by cladding, with the first sub-array of microLEDs being optically coupled to the second sub-array of photodetectors and the second sub-array of microLEDs being optically coupled to the first sub-array of photodetectors by fiber elements of different ones of the fiber sub-bundles;
wherein fiber elements of each fiber sub-bundle are arranged on a grid;
wherein each fiber sub-bundle comprises an inner region containing the fiber elements and an outer region, the outer region having outer boundary dimensions that are independent of variations in size and position of the fiber elements of the fiber sub-bundle; and
wherein the fiber sub-bundles are accurately positioned relative to each other only near ends of the fiber bundle.

2. The optical interconnect of claim 1, further comprising filler material between fiber elements of each fiber sub-bundle.

3. The optical interconnect of claim 1, wherein the grid is a hexagonal close packed grid.

4. The optical interconnect of claim 1, wherein the grid is a square grid.

5. The optical interconnect of claim 1, wherein ends of the fiber bundle are circumferentially encased by an outer jacket.

6. The optical interconnect of claim 5, wherein the outer jacket includes a flat edge, allowing for determination of rotational orientation of the fiber bundle.

7. The optical interconnect of claim 1, wherein the fiber bundle includes at least one fiducial feature.

8. An optical interconnect, comprising:
a first IC chip having a first plurality of sub-arrays of optoelectronic elements arranged in a first array shape;
a second IC chip having a second plurality of sub-arrays of optoelectronic elements arranged in a second array shape the same as the first array shape; and
a fiber bundle including a plurality of fiber sub-bundles, each of the fiber sub-bundles comprise a plurality of fibers, each of the plurality of fibers including a core concentrically surrounded by cladding, with optoelectronic elements of different ones of the first plurality of sub-arrays of optoelectronic elements optically coupled to optoelectronic elements of different ones of the second plurality of sub-arrays by fiber elements of different ones of the fiber sub-bundles;
wherein the plurality of fiber sub-bundles are arranged on a grid having a same shape as the first array shape and the second array shape;
wherein each fiber sub-bundle comprises an inner region containing the fiber elements and an outer region, the outer region having outer boundary dimensions that are independent of variations in size and position of the fiber elements of the fiber sub-bundle; and
wherein the fiber sub-bundles are accurately positioned relative to each other only near ends of the fiber bundle.

9. The optical interconnect of claim 8, wherein the first plurality of sub-arrays of optoelectronic elements comprises microLEDs and the second plurality of sub-arrays of optoelectronic elements comprises photodetectors.

10. The optical interconnect of claim 9, wherein the photodetectors are monolithically integrated with the second IC chip.

11. The optical interconnect of claim 9, wherein the microLEDs are solder-bonded to a top metal layer of the first IC chip.

12. The optical interconnect of claim 8, wherein the first array shape of the first plurality of sub-arrays of optoelectronic elements is square-shaped.

13. The optical interconnect of claim 8, wherein the first array shape of the first plurality of sub-arrays of optoelectronic elements is hexagonal-shaped.

14. The optical interconnect of claim 9, wherein the microLEDs and the photodetectors are arranged in a rectangular pattern.

15. The optical interconnect of claim 9, wherein the microLEDs and the photodetectors are arranged in a hexagonal pattern.

\* \* \* \* \*